US011567761B2

(12) United States Patent
Levin et al.

(10) Patent No.: US 11,567,761 B2
(45) Date of Patent: Jan. 31, 2023

(54) ANALYTIC WORKLOAD PARTITIONING FOR SECURITY AND PERFORMANCE OPTIMIZATION

(71) Applicant: Intel Corporation, Santa Clara, CA (US)

(72) Inventors: Itamar Levin, holon (IL); Guilad Melzer, Zichron Yaakov (IL); Alex Nayshtut, Gan Yavne (IL); Raizy Kellerman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 16/912,148

(22) Filed: Jun. 25, 2020

(65) Prior Publication Data
US 2020/0326937 A1 Oct. 15, 2020

(51) Int. Cl.
| | | |
|---|---|---|
| G06F 9/44 | (2018.01) | |
| G06F 9/22 | (2006.01) | |
| G06F 21/52 | (2013.01) | |
| G06F 21/55 | (2013.01) | |
| G06F 21/62 | (2013.01) | |
| G06F 9/28 | (2006.01) | |
| G06N 20/00 | (2019.01) | |
| G06F 8/41 | (2018.01) | |

(52) U.S. Cl.
CPC ............ *G06F 9/226* (2013.01); *G06F 8/4441* (2013.01); *G06F 9/28* (2013.01); *G06F 21/52* (2013.01); *G06F 21/55* (2013.01); *G06F 21/6209* (2013.01); *G06N 20/00* (2019.01)

(58) Field of Classification Search
CPC .......... G06F 9/226; G06F 8/4441; G06F 9/28; G06F 21/52; G06F 21/55; G06F 21/6209; G06N 20/00
USPC .................................................. 717/124–130
See application file for complete search history.

(56) References Cited

U.S. PATENT DOCUMENTS

2019/0317805 A1* 10/2019 Metsch .................. G06N 20/10

* cited by examiner

*Primary Examiner* — Chuck O Kendall
(74) *Attorney, Agent, or Firm* — KDB Firm PLLC

(57) ABSTRACT

The present disclosure provides privacy preservation of analytic workflows based on splitting the workflow into sub-workflows each with different privacy-preserving characteristics. Libraries are generated that provide for formatting and/or encrypting data for use in the sub-workflows and also for compiling a machine learning algorithm for the sub-workflows. Subsequently, the sub-workflows can be executed using the compiled algorithm and formatted data.

25 Claims, 7 Drawing Sheets

ANALYTIC WORKLOAD PARTITIONING FOR SECURITY AND PERFORMANCE OPTIMIZATION

BACKGROUND

Developing and deploying artificial intelligent systems requires large data sets. However, access to data sets having a sufficient sample size and quality to be useful for analytic processing (e.g., machine learning, or the like) can be limited due to numerous confidentiality and privacy reasons. For example, entities may be reluctant to share data that includes private or confidential information. In other instances, limitations on sharing information can be imposed by government regulation, such as, for example, the GDPR, CCPA, or the like. These limitations on the ability to share or provide access to data has significant implications in fields that are increasingly reliant on data analytics, such as, health care, finance, and manufacturing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
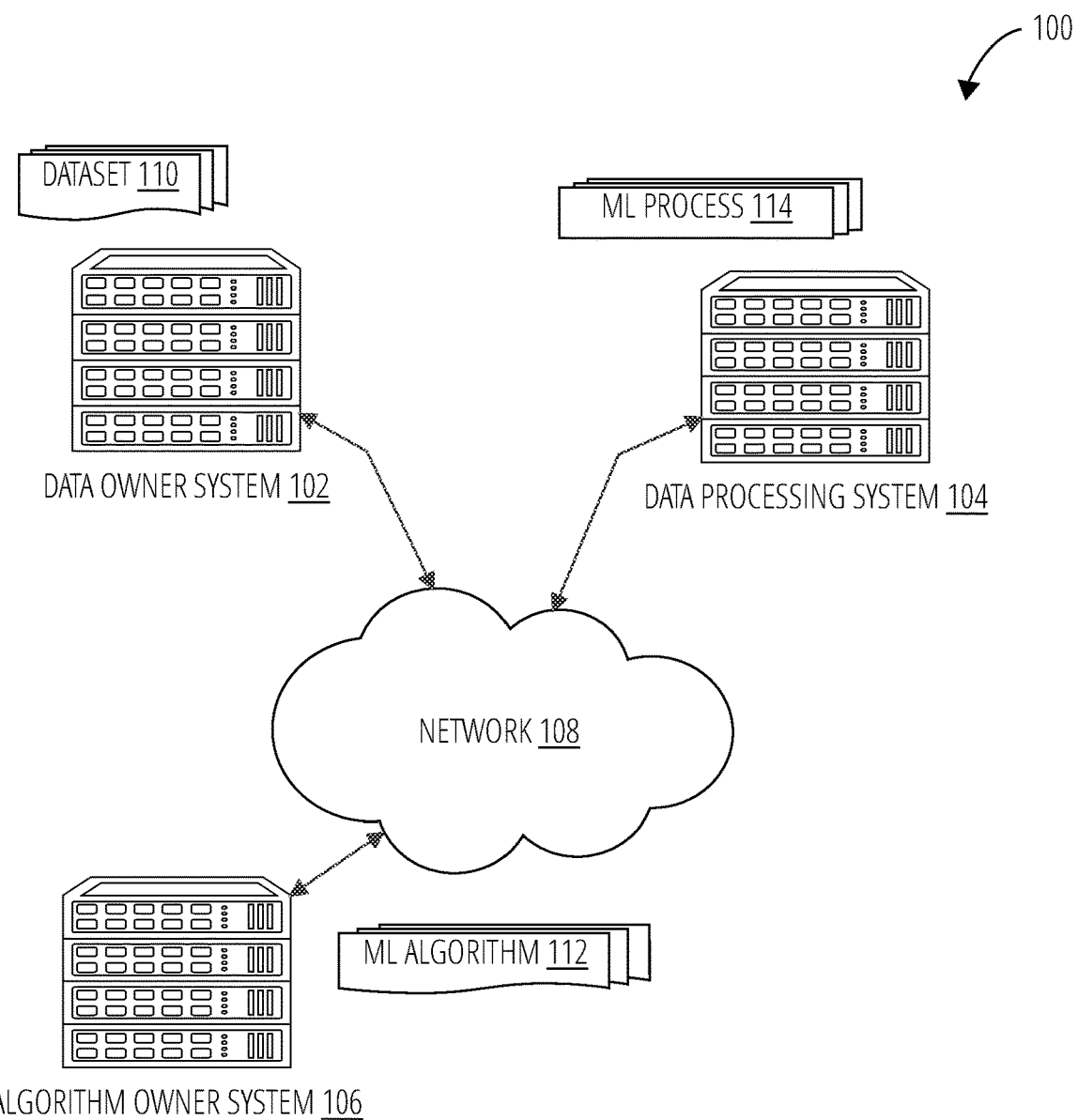
FIG. 1 illustrates a diagram of a privacy preservation system 100 in which embodiments of the present invention may be implemented.

The present disclosure provides a model to enable sharing or exchanging of data for computational use (e.g., machine learning, data analytics, etc.) while preserving privacy and/or confidentiality of the data. In general, the present disclosure provides to split the analytic workload and the data into sub-workflows where each sub-workflow comprises portions of computational analytic workflow applied to the data (or portions of the data) suited to a particular privacy-preserving workflow. Each sub-workflow can be processed by a privacy-preserving engine adapted to the particular privacy-preserving workflow. As such, the data can be processed (e.g., used in machine learning training, used for inference by a machine learning model, or the like) by multiple privacy-preserving engines where each engine operates on data optimized for that particular engine. Thus, the present disclosure provides to maintain an end-to-end encryption of the data while optimizing the mathematical operations unique to each privacy-preserving workflow.

The present disclosure provides a number of advantages and improvements in computational analytics. Particularly, the present disclosure provides an improvement in maintaining privacy and/or confidentiality of data used in computational analytic processes. For example, one approach to preserving privacy of data sets used in machine learning is to apply a heuristic transformation on the dataset using a mask to anonymize the data. However, such transformations often impact the usefulness of the data for inference (and in some cases, for training) by machine learning models.

Another approach involves encrypting the data and restricting the decryption and use of the data to trusted execution environments. However, this approach requires trust in the developer of the trusted execution environment and that the computing system executing the trusted execution environment is not tampered with or compromised.

Another approach involves using homomorphic encryption, which allows application of mathematical operands directly to encrypted data (i.e., without a need to decrypt the data). Unfortunately, processing homomorphically encrypted data carries an extremely high computational overhead. In many cases, the computational overhead (e.g., processing, memory, or both) for homomorphic encryption can be five (5) orders of magnitude greater than the computational overhead of the same mathematical operand applied to plain text.

Still, another approach uses secure multi-party computation, which provides sharing computation between several non-colluding parties so that any party cannot recover the inputs or the results independently. In many cases, the computational and communicational overhead makes this approach orders of magnitude slower than when using single party execution.

Thus, the present disclosure provides a number of advantageous and improvements to computing systems. For example, by splitting the workload into sub-workloads and assigning processing of the sub-workloads to a number of different privacy-preserving engines, computational and communicational overhead is reduced. Furthermore, as the dataset is kept encrypted throughout the entire process there is no need to establish and maintain trust between the owners of the data and the developers or users of the data. As a specific example, the present disclosure provides a system whereby trust between data owners and those that use the data (e.g., for training of machine learning models, inference by machine learning models, or the like) does not need to be established or maintained. Furthermore, the computational costs associated with running complex workloads on purely-homomorphic encrypted data is removed.

Reference is now made to the detailed description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein. The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

FIG. 1 is a privacy preservation system 100 to provide privacy-preserving analytic processing as described herein. Privacy preservation system 100 features a data owner system 102, a data processing system 104, and an algorithm owner system 106, all communicatively coupled via network 108.

In various examples, the network 108 may include the Internet, a local area network (LAN), a wide area network (WAN), and/or other data network. Data may be communicated between data owner system 102, data processing system 104, and/or algorithm owner system 106 via network 108 using data-networking protocols (e.g., HTTP, TCP/IP, RTP/RTSP, IPX, UDP, WiFi, NFC, Bluetooth, power-line communication (PLC), or the like). In some embodiments, the network 108 may also include a voice network that conveys not only voice communications, but also non-voice data such as Short Message Service (SMS) messages, as well as data communicated via various cellular data communication protocols, and the like.

In various embodiments, data owner system 102, data processing system 104, and/or algorithm owner system 106 may include servers, cloud computing resources, workstation computing devices, personal computing devices, laptop computers, tablets, smart phones, or other computing devices that are capable of connecting to the network 108 and communicating with other computing devices as described herein.

In various embodiments, additional infrastructure (e.g., short message service centers, cell sites, routers, gateways, firewalls, and the like), as well as additional devices may be present. Further, in some embodiments, the functions described as being provided by some or all of the data owner system 102, data processing system 104, and/or algorithm owner system 106 may be implemented via various combinations of physical and/or logical devices. As a specific example, a single computing system (e.g., cloud computing deployment, or the like) can provide the functions described with reference to the data processing system 104 and algorithm owner system 106. Examples are not, however, limited in this manner. It is to be appreciated that it is not necessary to show all possible structure and implementation details necessary in FIG. 1 in order to describe an illustrative embodiment.

In general, privacy preservation system 100 can provide for preservation of privacy of a dataset 110 when used by a machine learning process 114, based on machine learning algorithm 112. It is noted, that typically "dataset" is used to refer to data used during training of a machine learning model (e.g., refer to FIGS. 2 and 3) while "samples" are used to refer to data used during inference by the machine learning model. In the present disclosure, dataset and data are used to mean data used during both training and inference. A distinction can be made based on the context or those of ordinary skill in the art will appreciate the difference between whether the data and model discussed are in a training phase or an inference phase.

Furthermore, privacy preservation system 100 can provide for preservation of privacy of the parameters of the machine learning algorithm 112, such as, definitions of the model and the like. It is noted, that although the present disclosure references machine learning and is applicable to preserving privacy of datasets used in machine learning processes, the disclosure can be applied to preserve privacy of data used in any analytic process.

Figure 2:
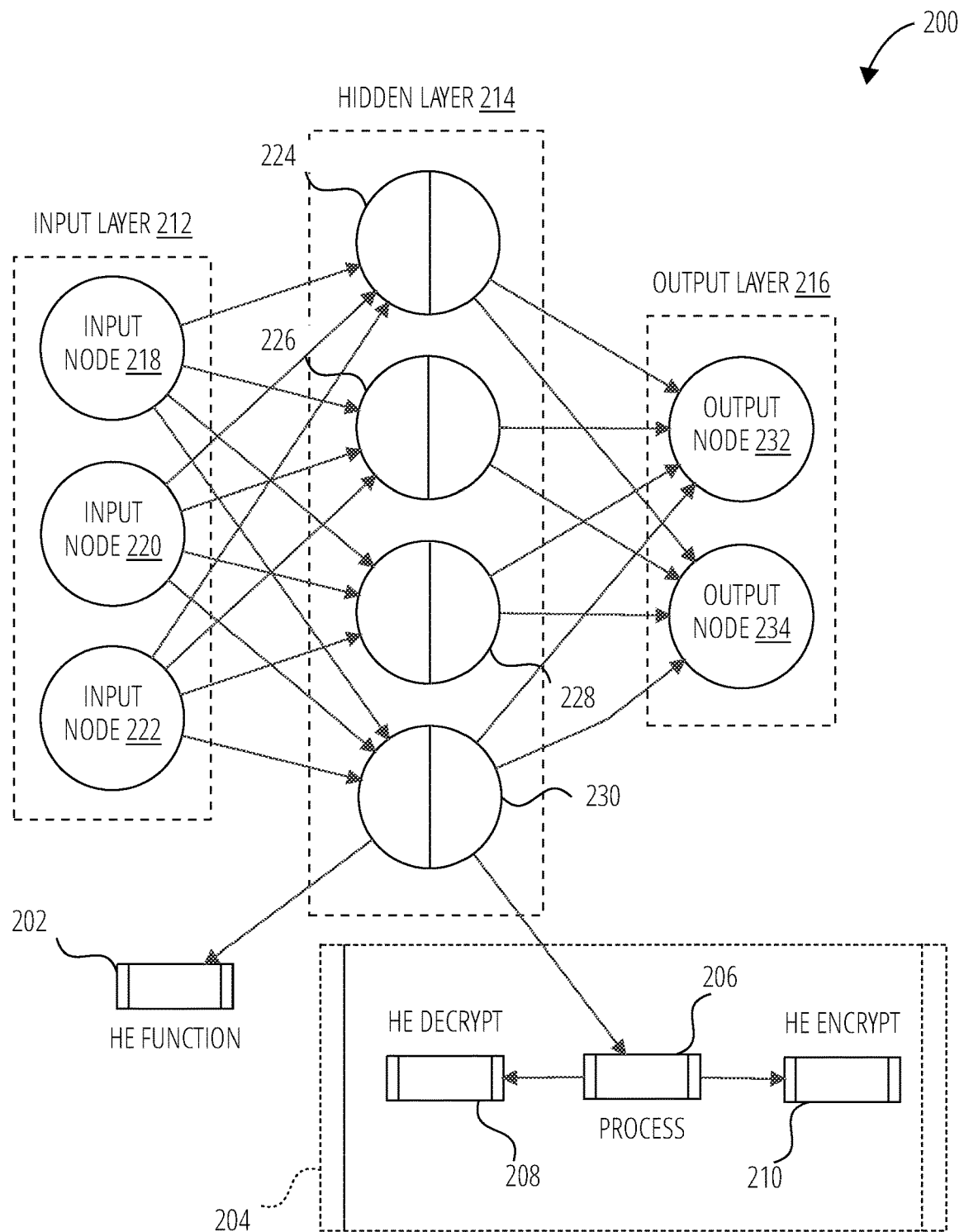
FIG. 2 illustrates a machine learning model 200.

For example, FIG. 2 illustrates an example machine learning model 200, provided to describe a simplified workload splitting process that can be implemented according to the present disclosure. Machine learning model 200 includes an input layer 212, a hidden layer 214, and an output layer 216 with a number of nodes in each layer. It is to be appreciated that machine learning model 200 is a neural network with a size (e.g., number of layers and nodes) easily depicted in this figure. However, the size and form of machine learning model 200 not to be interpreted as limiting to the disclosure.

In machine learning model 200, input layer 212 includes input node 218, input node 220, and input node 222. Likewise, hidden layer 214 includes hidden layer node 224, hidden layer node 226, hidden layer node 228, and hidden layer node 230. Similarly, output layer 216 includes output node 232 and output node 234. During operation, machine learning model 200 can operate on data (e.g., dataset 110, or the like) to execute a machine learning algorithm (e.g., machine learning algorithm 112, or the like) while preserving the privacy and/or confidentiality of the data. More particularly, data can be input to input layer 212, processed through hidden layer 214, and an output can be provided by output layer 216. It is noted that the various methods of performing training and inference in machine learning model 200 are not covered in this disclosure. However, in general, data is weighted (e.g., scaled, or the like) at connections between nodes and transformed (e.g., operated on by a mathematical operation, or the like) at nodes (e.g., nodes of hidden layer 214, or the like). This entire process can be referred to as a workflow.

The present disclosure provides to split the workflow into multiple sub-workflows. For example, encrypted data can be provided to input layer 212, such as, as homomorphically encrypted data. Operations for the hidden layer 214 can be split into multiple sub-workflows. As depicted, a first sub-workflow 202 associated with data from input layer to hidden layer can be provided. As a specific example, sub-workflow 202 can correspond to a homomorphic encrypted (HE) data operation, such as, HE dot product, or the like. As second sub-workflow 204 associated with hidden layer 214 to output layer 216 operations can also be provided. Sub-workflow 204 can itself include a number of sub-processes. As a specific example, sub-workflow 204 can include process 208 to decrypt homomorphic encrypted data (e.g., data entering hidden layer 214, or the like), process 206 to perform operations (e.g, mathematical operands, or the like) on decrypted data, and process 210 to homomorphically encrypt the result of process 206. With some examples, sub-workflow 204 can be implemented within a secure processing environment, such as, for example, a trusted execution environment, or the like.

Note, that the present disclosure provides systems, methods, operations, and techniques for facilitating use of data in machine learning processors to preserve the privacy of the date based on splitting the workload (e.g., algorithmic machine learning process) into multiple sub-workflows (e.g., sub-workflow 202 and sub-workflow 204, or the like). As such, privacy of data used in machine learning applications can be preserved while reducing the computational and communicational overhead versus conventional methods.

Figure 3:
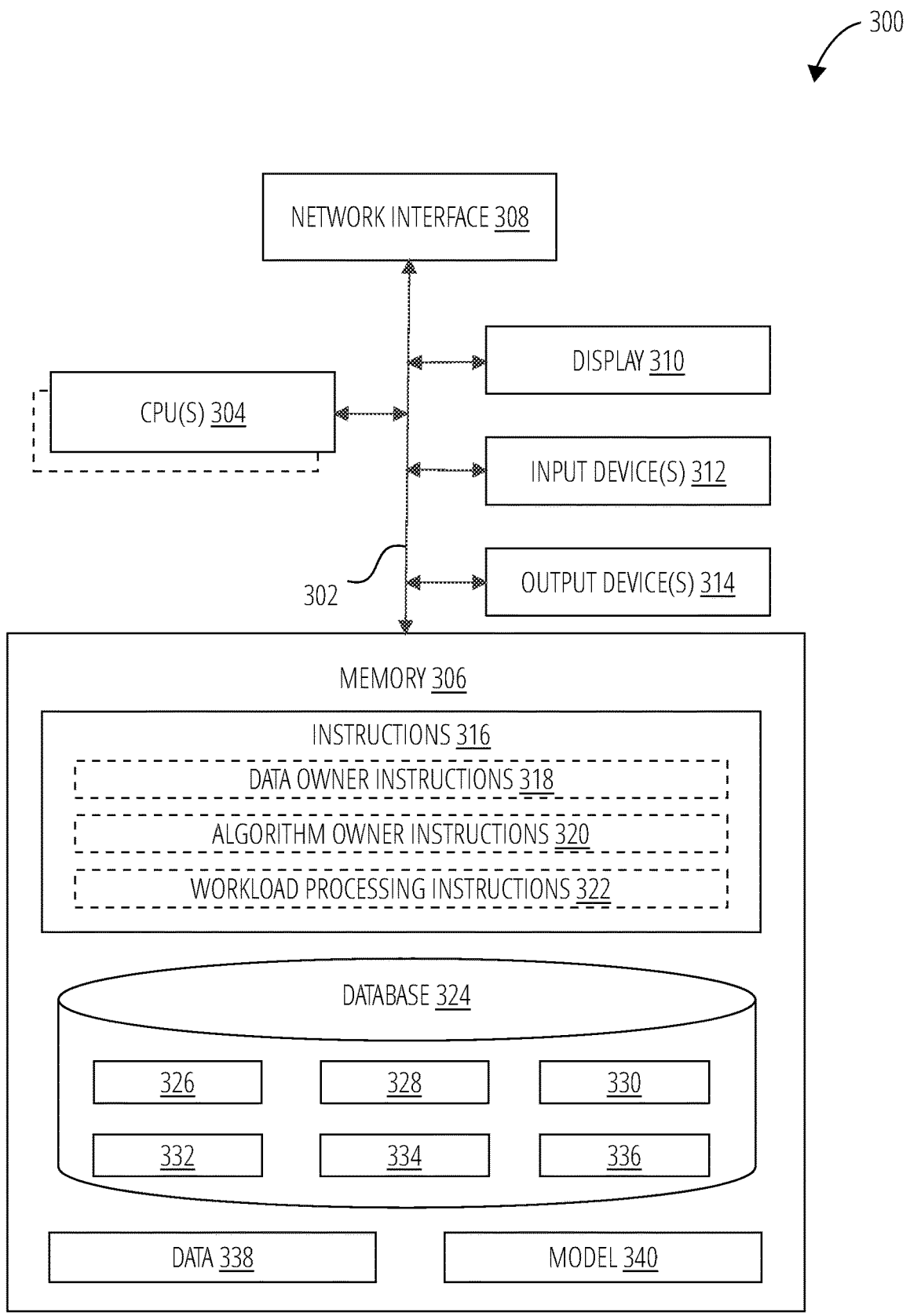
FIG. 3 illustrates a system 300.

FIG. 3 illustrates several components of an exemplary system 300, in accordance with embodiments of the disclosure. It is noted, that any one or more of data owner system 102, data processing system 104, and/or algorithm owner system 106 can be implemented by structure similar to system 300. Furthermore, it is to be appreciated that system 300 can include more (or less) components than those shown in FIG. 3. Collectively, the various tangible components or a subset of the tangible components may be referred to herein as "circuitry" (or occasionally "logic") configured or adapted in a particular way. In various embodiments, system 300 may comprise one or more physical and/or logical devices that collectively provide the functionalities described herein. In some embodiments, system 300 may comprise one or more replicated and/or distributed physical or logical devices.

In some embodiments, system 300 may comprise one or more computing resources provisioned from a "cloud computing" provider (e.g., Amazon Elastic Compute Cloud, Sun Cloud Compute Utility, Windows Azure, or the like). In other embodiments, system 200 can be a server or a workstation comprising physical compute resources arranged to provide the functionality described.

System 300 includes a bus 302 interconnecting several components including a central processing unit 304, memory 306, and a network interface 308. Additionally, system 300 can include a display 310, input device(s) 312, and/or output device(s) 314, also coupled via bus 302.

In general, bus 302 provides a mechanism for enabling the various components and subsystems of system 300 to communicate with each other as intended. In some examples, bus 302 can be any of a variety of busses, such as, for example, a PCI bus, a USB bus, a front side bus, or the like. Furthermore, although system 300 is depicted schematically including a single bus 302, some embodiments of system 300 can include multiple distinct busses.

System 300 can include one or more of central processing unit 304 (CPU). Each central processing unit 304 can include a multi-threaded processor or a multi-core processor (whether the multiple cores coexist on the same or separate dies). Further, each central processing unit 304 need not be identical. In some examples, central processing unit 304 may include graphics processing portions and may include dedicated memory, multiple-threaded processing and/or some other parallel processing capability. In some examples, the central processing unit 304 may be an application specific integrated circuit (ASIC) or a field programmable integrated circuit (FPGA). In some implementations, the central processing unit 304 may be circuitry arranged to perform particular computations, such as, related to artificial intelligence (AI), machine learning, or graphics. Such circuitry may be referred to as an accelerator. Furthermore, although referred to herein as a CPU, circuitry associated with central processing unit 304 may be a graphics processing unit (GPU).

Memory 306 can be a tangible media configured to store computer readable data and instructions. Examples of tangible media include circuitry for storing data (e.g., semiconductor memory), such as, flash memory, non-transitory read-only-memory (ROMS), dynamic random access memory (DRAM), NAND memory, NOR memory, phase-change memory, battery-backed volatile memory, or the like. In general, memory 306 will include at least some non-transitory computer-readable medium arranged to store instructions executable by circuitry (e.g., central processing unit 304, or the like). Memory 306 could include a DVD/CD-ROM drive and associated media, a memory card, or the like. Additionally, memory 306 could include a hard disk drive or a solid-state drive.

Display 310 can include any of a devices to display images, or a graphical user interfaces (GUI). The input device(s) 312 include devices and mechanisms for inputting information to the system 300. These may include a keyboard, a keypad, a touch screen incorporated into the display 310, audio input devices such as voice recognition systems, microphones, and other types of input devices. In various embodiments, the input device(s) 312 may be embodied as a computer mouse, a trackball, a track pad, a joystick, wireless remote, drawing tablet, voice command system, eye tracking system, and the like. The input device(s) 312 typically allow a user to select objects, icons, control areas, text and the like that appear on the display 310 via a command such as a click of a button or the like.

The output device(s) 314 include devices and mechanisms for outputting information from the system 300. These may include the display 310, speakers, printers, infrared LEDs, and so on as well understood in the art.

Memory 306 may include instructions 316, such as, data owner instructions 318, algorithm owner instructions 320, and workload processing instructions 322. Furthermore, memory 306 may include database 324. In some embodiments, system 300 may communicate with database 324 via network interface 308, a storage area network ("SAN"), a high-speed serial bus, and/or via the other suitable communication technology. In some embodiments, database 324 may comprise one or more storage resources provisioned from a "cloud storage" provider, for example, Amazon Simple Storage Service, Google Cloud Storage, and the like.

Database 324 can include indications of data, workloads, algorithms, and such used for providing the workload splitting operations described herein. For example, database 324 can include data information 326, mathematical primitives 328, communication requirements 330, results requirements 332, data formatting libraries 334, and algorithm formatting libs 336. Additionally, memory 306 can include encrypted reformatted data 338 and compiled model 340. This will be described in greater detail below.

Figure 4:
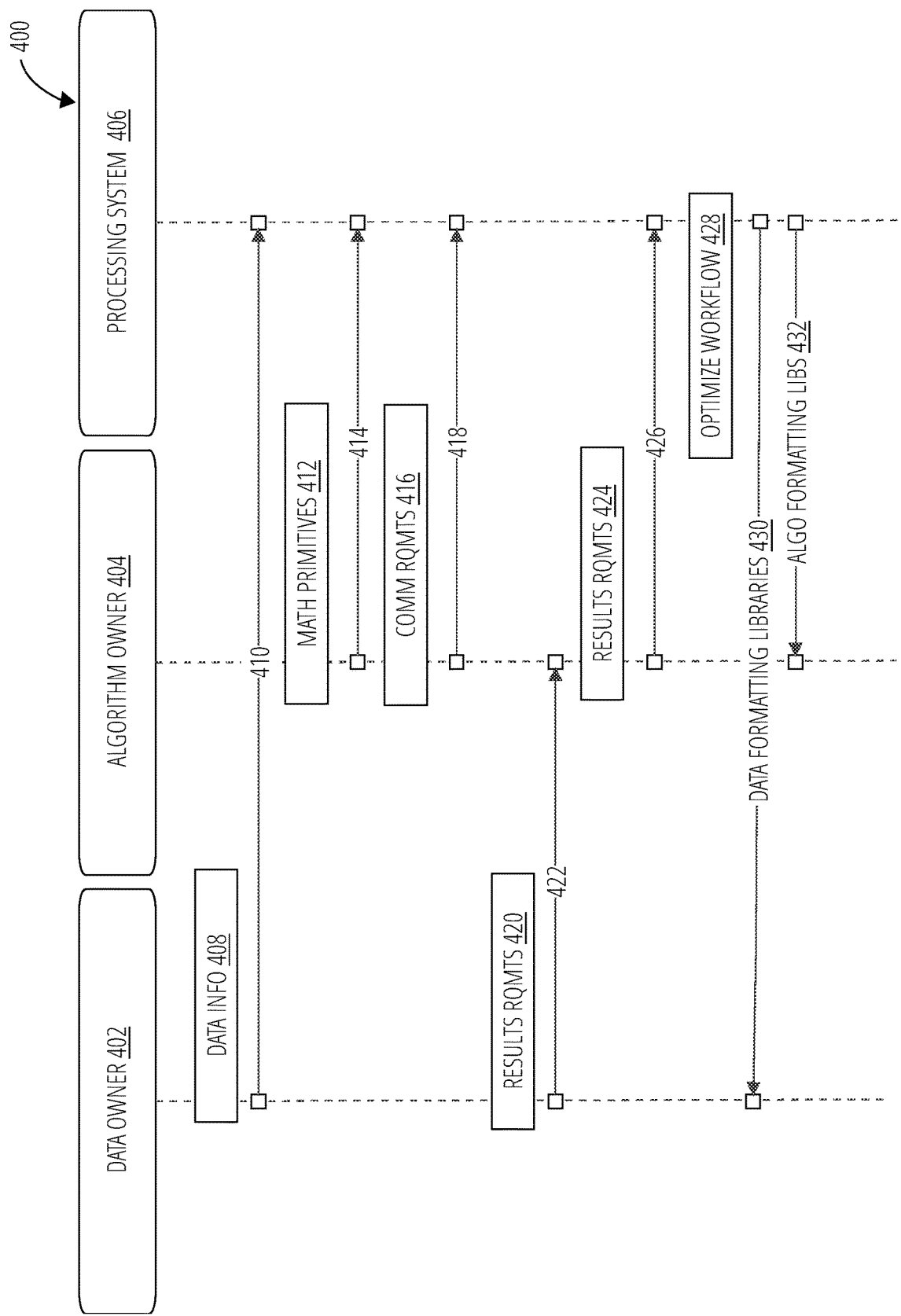
FIG. 4 illustrates a technique 400.

As noted, the present disclosure is applicable to splitting a workflows into sub-workflows for use in machine learning. Example techniques for splitting a workflow and processing a split workflow are described. In general, FIG. 4 illustrates a technique 400 for splitting a workflow into sub-workflows for use in machine learning, according to examples of the present disclosure. FIG. 4 illustrates operations for a data owner 402, an algorithm owner 404, and a processing system 406. In general, operations described with reference to technique 400 can be implemented by multiple computing system, such as, system 300 of FIG. 3. Particularly, central processing unit 304 in executing instructions 316 can implement technique 400. In general, operations for data owner 402, algorithm owner 404, and/or processing system 406 can be carried out by different computing systems and/or entities. For example, operations for data owner 402 can be carried out by a computing system, such as, data owner system 102. Likewise, operations for algorithm owner 404 can be carried out by a computing system, such as, algorithm owner system 106. Additionally, operations for processing system 406 can be carried out by a computing system, such as, data processing system 104.

Technique 400 is described with reference to system 300. However, it is to be appreciated that operations associated with each actor (e.g., data owner 402, algorithm owner 404, and processing system 406) can be implemented by a different system 300. Technique 400 can begin at operation 408. At operation 408, central processing unit 304 can execute data owner instructions 318 to generate and/or identify information about a workload dataset. For example, central processing unit 304 can identify data information 326 about dataset 110 to be used in a machine learning process (e.g., based on machine learning algorithm 112, or the like). With some examples, data information 326 identified at operation 408 can include static information about dataset 110 (e.g., structure, confidentiality, ownership, if any portions are not confidential, etc). Continuing to operation 410, central processing unit 304 can execute data owner instructions 318 to provide data information 326 to processing system 406 (e.g., data processing system 104, or the like).

At operation 412, central processing unit 304 can execute algorithm owner instructions 320 to generate and/or identify information about the mathematical primitives to be used in the analytic process (e.g, machine learning algorithm 112, or the like). For example, central processing unit 304 can identify mathematical primitives 328 used by machine learning algorithm 112, or the like. As another example, central processing unit 304, at operation 412, can execute algorithm owner instructions to other information about the analytic process)(e.g., security requirements such as, encryption algorithms, key size, or the like, runtime budget, memory and cache usage, etc.) Continuing to operation 414, central processing unit 304 can execute algorithm owner instructions 320 to provide the mathematical primitives 328 to be used by the machine learning process to processing system 406 (e.g., data processing system 104, or the like).

At operation 416, central processing unit 304 can execute algorithm owner instructions 320 to generate and/or identify information about the communication requirements 330 of the machine learning process (e.g., machine learning algorithm 112, or the like). For example, central processing unit 304 can determine how much data must be transferred between sub-workflows to facilitate workflow splitting and/or the encryption parameters that must be supported to enable secure partitioning. As a specific example, referring to FIG. 2, central processing unit 304 can determine how much data would be transferred between sub-workflow 202 and sub-workflow 204. Continuing to operation 418, central processing unit 304 can execute algorithm owner instructions 320 to provide the communication requirements 330 to processing system 406 (e.g., data processing system 104, or the like).

At operation 420, central processing unit 304 can execute data owner instructions 318 to generate and/or identify result requirements. For example, central processing unit 304 can identify information about results (e.g., confidentiality of the results, format for results, etc.) needed from the machine learning process and store as results requirements 332. With some examples, the results requirements 332 may be based on the dataset 110 and/or requirements of the owner of the dataset 110 (e.g., whether the results are confidential, or not). Continuing to operation 422, central processing unit 304 can execute data owner instructions 318 to provide the results requirements to processing system 406 (e.g., data processing system 104, or the like).

At operation 424, central processing unit 304 can execute algorithm owner instructions 320 to generate and/or identify result requirements. For example, central processing unit 304 can identify information about results. With some examples, the results data may be based on the machine learning algorithm 112 (e.g., format of the results, etc). Continuing to operation 426, central processing unit 304 can execute algorithm owner instructions 320 to provide the results requirements 332 to processing system 406 (e.g., data processing system 104, or the like).

At operation 428, central processing unit 304 can execute workload processing instructions 322 to optimize the workflow. As used herein, the term "optimize workflow" can mean split the workflow into sub-workflows. For example, central processing unit 304 can split the workflow (e.g., processing associated with the workflow) into sub-workflows based on a variety of factors. For example, central processing unit 304 can provide sub-workflows optimized for various mathematical primitives 328. As a specific example, linear operations on homomorphic data are more efficient than non-linear operations. As such, a sub-workflow for linear operations of HE data can be provided while another sub-workflow for non-linear operations to be processed within a privacy preserving structure (e.g., TEE, MPC, or the like) can also be provided. As another example, a workflow can be split based on the "sensitivity" of the data. The sensitivity can be specified by the data owner or can be generalized based on the data itself. In such an example, the more sensitive data can be assigned a sub-workflow using HE or MPC processing while the less sensitive data can be assigned a sub-workflow using a TEE.

In some examples, central processing unit 304 can optimize workflow based on bandwidth considerations (e.g., communication requirements 330, or the like). For example, a number of sub-workflows to use can be determined based on available bandwidth given that bandwidth requirements will increase with an increase in the number of sub-workflows. Furthermore, central processing unit 304 can optimize the workflow based on security and privacy goals and/or requirements. Additionally, central processing unit 304 can optimize the workflow based customer requirements (e.g., latency, throughput, compute costs, memory and storage costs, network costs, etc).

Furthermore, at operation 428, central processing unit 304 can determine a protection scheme for the dataset 110. For example, central processing unit 304 can determine the type of encryption, how to change between encryption types when transitioning between sub-workflows, encryption parameters (e.g., cryptography algorithm, key size, key rolling and/or frequency, etc).

Lastly, at operation 428, central processing unit 304 can generate for formatting data (e.g., dataset 110) and algorithms (e.g., machine learning algorithm 112) for use in the sub-workflows. For example, central processing unit 304 can general data formatting libraries 334 for use by data owner 402 in formatting and encrypting dataset 110 to form encrypted reformatted data 338. Likewise, central processing unit 304 can generate algorithm formatting libs 336 for use by algorithm owner 404 in compiling machine learning algorithm 112 to form compiled model 340. Continuing to operation 430, central processing unit 304 can execute workload processing instructions 322 to provide data formatting libraries (e.g., data formatting libraries 334) to data owner 402 (e.g., data owner system 102, or the like). Likewise, at operation 432, central processing unit 304 can execute workload processing instructions 322 to provide algorithm formatting libraries (e.g., algorithm formatting libs 336) to algorithm owner 404 (e.g., algorithm owner system 106, or the like).

Figure 5:
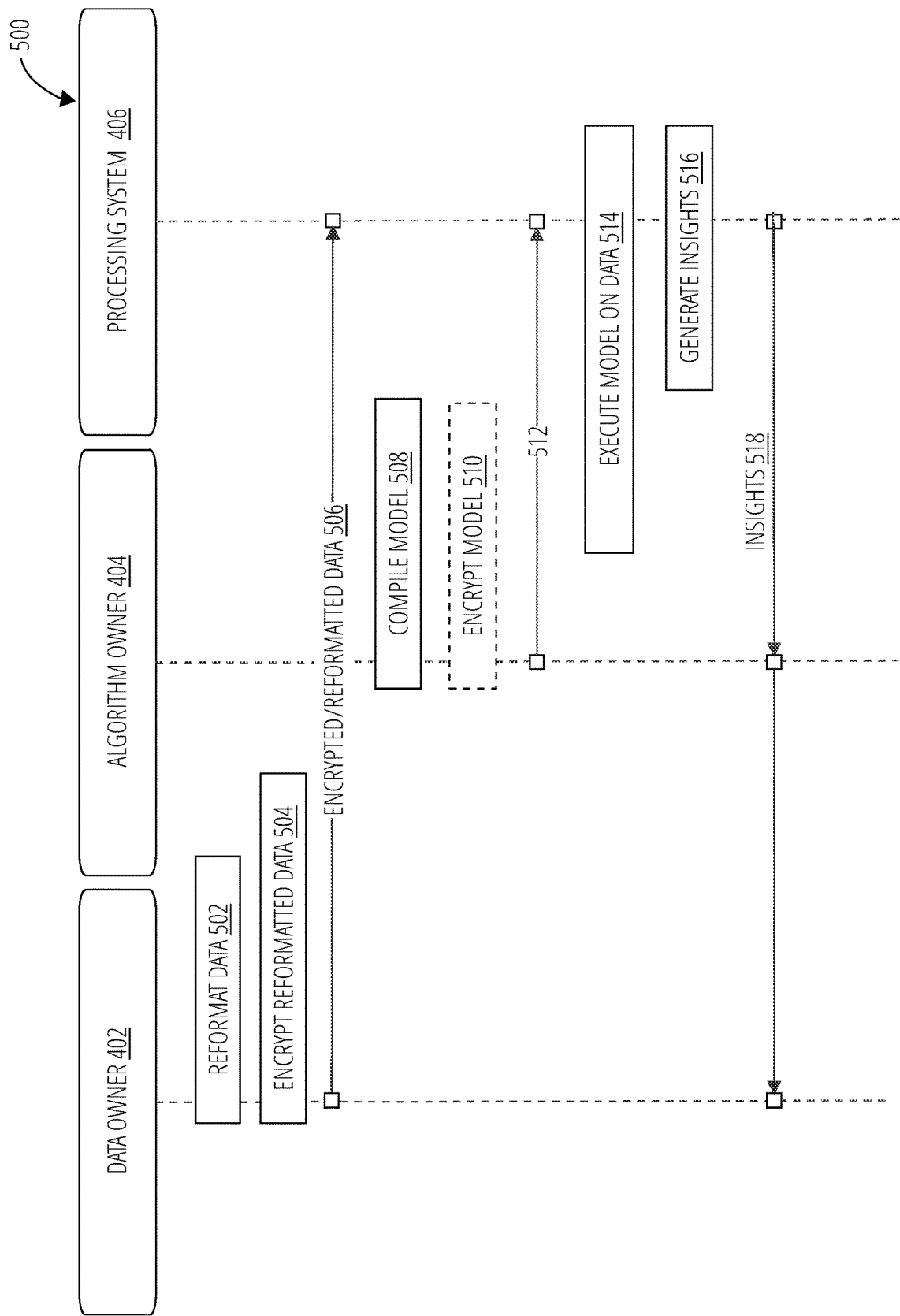
FIG. 5 illustrates a technique 500.

FIG. 5 illustrates a technique 500 for processing a machine learning workflow that has been split into sub-workflows, according to examples of the present disclosure. FIG. 5 illustrates operations for data owner 402, an algorithm owner 404, and a processing system 406, described above. In general, operations described with reference to technique 500 can be implemented by multiple computing system, such as, system 300 of FIG. 3. Particularly, central processing unit 304 in executing instructions 316 can implement technique 500. Like described above, operations for data owner 402, algorithm owner 404, and/or processing system 406 can be carried out by different computing systems and/or entities. For example, operations for data owner 402 can be carried out by a computing system, such as, data owner system 102. Likewise, operations for algorithm owner 404 can be carried out by a computing system, such as, algorithm owner system 106. Additionally, operations for processing system 406 can be carried out by a computing system, such as, data processing system 104.

Technique 500 is described with reference to system 300. However, it is to be appreciated that operations associated with each actor (e.g., data owner 402, algorithm owner 404, and processing system 406) can be implemented by a different system 300. Technique 500 can begin at operation 502. At operation 502, central processing unit 304 can execute data owner instructions 318 to format (or reformat)

dataset 110 based on data formatting libraries 334 (e.g., as generated by technique 400, or the like). Continuing to operation 504, central processing unit 304 can execute data owner instructions 318 to encrypt the formatted dataset 110, forming encrypted reformatted data 338. Continuing to operation 506, central processing unit 304 can execute data owner instructions 318 to send the encrypted reformatted data 338 to processing system 406.

At operation 508, central processing unit 304 can execute algorithm owner instructions 320 to compile an analytic model (e.g., machine learning model, or the like) based on machine learning algorithm 112 and algorithm formatting libs 336 (e.g., as generated by technique 400, or the like), forming compiled model 340. With some examples, technique 500 can include operation 510, where central processing unit 304 executes algorithm owner instructions 320 to encrypt the compiled model 340. Continuing to operation 512, central processing unit 304 can execute algorithm owner instructions 320 to send the compiled model 340 to processing system 406.

At operation 514, central processing unit 304 can execute workload processing instructions 322 to process encrypted reformatted data 338 with compiled model 340. Said differently, central processing unit 304 can execute compiled model 340 with encrypted reformatted data 338. Continuing to operation 516, central processing unit 304 can execute workload processing instructions 322 to generate "insights" related to execution of the compiled model 340 with encrypted reformatted data 338. As an example, "insights" can be differentially-private statistics on the training data (e.g., statistics that don't reveal private info about the training data), loss values of the training iterations, or the like. In general, insights can be any information or feedback from execution of the split workflows. For example, insights can include inferences of compiled model 340, training feedback, or the like. Continuing to operation 518, central processing unit 304 can execute workload processing instructions 322 to send insights to algorithm owner 404 and/or data owner 402.

Figure 6:
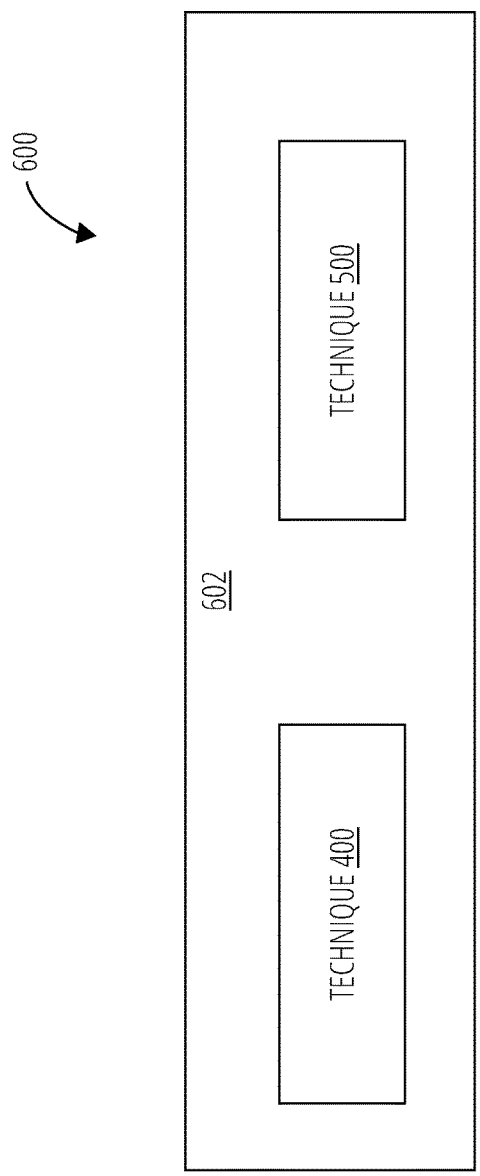
FIG. 6 illustrates a computer-readable storage medium 600.

FIG. 6 illustrates computer-readable storage medium 600. Computer-readable storage medium 600 may comprise any non-transitory computer-readable storage medium or machine-readable storage medium, such as an optical, magnetic or semiconductor storage medium. In various embodiments, computer-readable storage medium 600 may comprise an article of manufacture. In some embodiments, 700 may store computer executable instructions 602 with which circuitry (e.g., processor 706, or the like) can execute. For example, computer executable instructions 602 can include instructions to implement operations described with respect to technique 400, technique 500. Examples of computer-readable storage medium 600 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 602 may include any suitable type of code, such as source code, compiled code, interpreted code, executable code, static code, dynamic code, object-oriented code, visual code, and the like.

Figure 7:
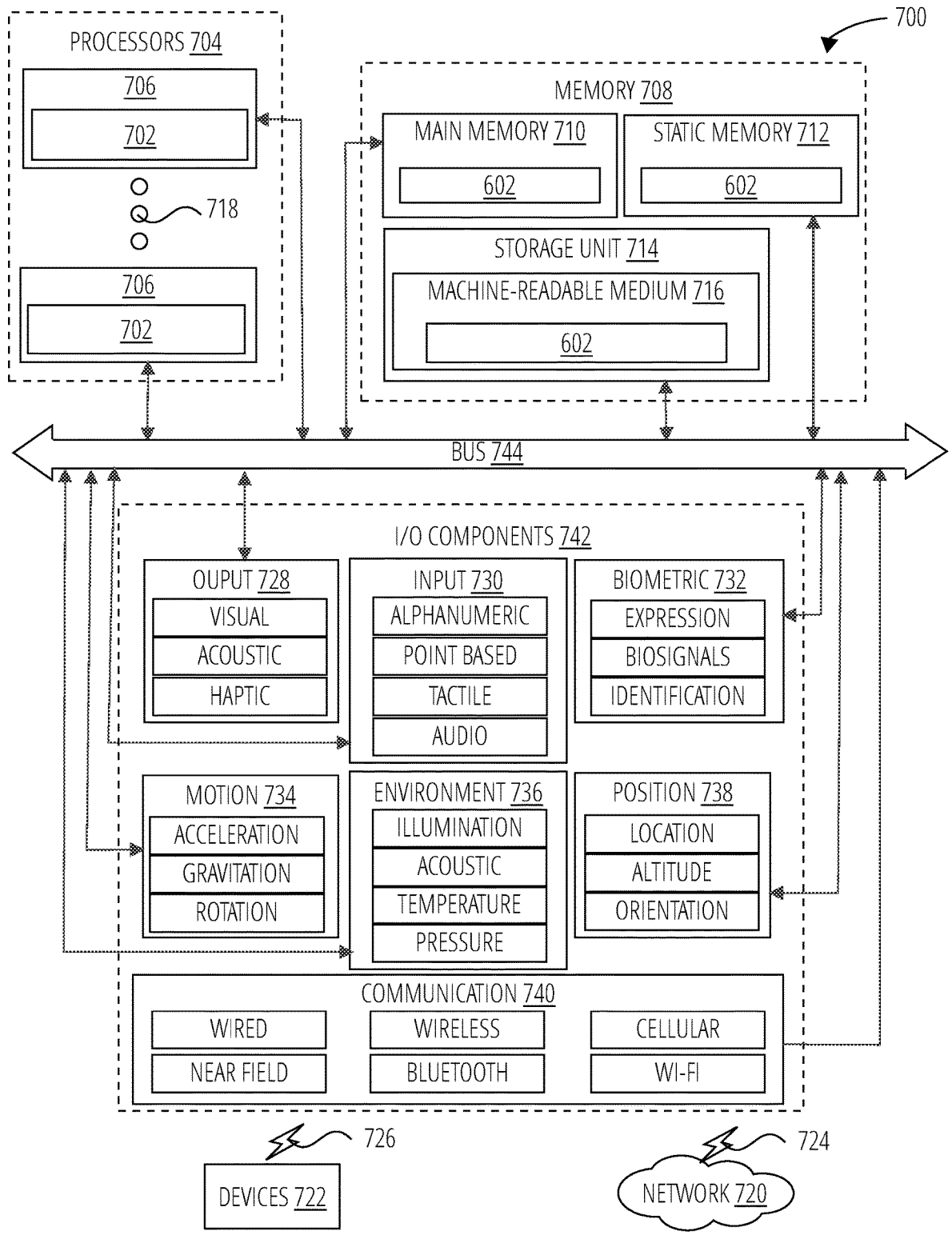
FIG. 7 illustrates a diagrammatic representation of a machine 700 in the form of a computer system.

FIG. 7 illustrates a diagrammatic representation of a machine 700 in the form of a computer system within which a set of instructions may be executed for causing the machine to perform any one or more of the methodologies discussed herein. More specifically, FIG. 7 shows a diagrammatic representation of the machine 700 in the example form of a computer system, within which computer executable instructions 602 (e.g., software, a program, an application, an applet, an app, or other executable code) for causing the machine 700 to perform any one or more of the methodologies discussed herein may be executed. For example the computer executable instructions 602 may cause the machine 700 to execute technique 400 of FIG. 4, technique 500 of FIG. 5, or the like. More generally, the computer executable instructions 602 may cause the machine 700 to split workflows as described herein to preserve privacy and confidentiality of data for use in analytic processing. More particularly, machine 700 can be arranged to split a workflow, generate libraries based on the workload splitting, format/encrypt data based on the libraries, and/or compile a machine learning algorithm based on the libraries.

The computer executable instructions 602 transform the general, non-programmed machine 700 into a particular machine 700 programmed to carry out the described and illustrated functions in a specific manner. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the computer executable instructions 602, sequentially or otherwise, that specify actions to be taken by the machine 700. Further, while only a single machine 700 is illustrated, the term "machine" shall also be taken to include a collection of machines 200 that individually or jointly execute the computer executable instructions 602 to perform any one or more of the methodologies discussed herein.

The machine 700 may include processors 704, memory 708, and I/O components 742, which may be configured to communicate with each other such as via a bus 744. In an example embodiment, the processors 704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a first processor 706 and a second processor 706 each including interconnect link 702. The first processor 706 and the second processor 706 may be coupled via interconnect 718.

The memory 708 may include a main memory 710, a static memory 712, and a storage unit 714, both accessible to the processors 704 such as via the bus 744. The main memory 708, the static memory 712, and storage unit 714 store the computer executable instructions 602 embodying any one or more of the methodologies or functions described herein. The computer executable instructions 602 may also reside, completely or partially, within the main memory 710, within the static memory 712, within machine-readable medium 716 within the storage unit 714, within at least one of the processors 704 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones will likely include a touch input device or other such input mechanisms, while a headless server machine will likely not include such a touch input device. It will be appreciated that the I/O components 742 may include many other components that are not shown in FIG. 7. The I/O components 742 are grouped according to functionality merely for simplifying the following discussion and the grouping is in no way limiting. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 may include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (i.e., memory 708, main memory 710, static memory 712, and/or memory of the processors 704) and/or storage unit 714 may store one or more sets of instructions and data structures (e.g., software) embodying or utilized by any one or more of the methodologies or functions described herein. These instructions (e.g., the computer executable instructions 602), when executed by processors 704, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 720 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 720 or a portion of the network 720 may include a wireless or cellular network, and the coupling 724 may be a Code Division Multiple Access (CDMA) connection, a Global System for Mobile communications (GSM) connection, or another type of cellular or wireless coupling. In this example, the coupling 724 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The computer executable instructions 602 may be transmitted or received over the network 720 using a transmission medium via a network interface device (e.g., a network interface component included in the communication components 740) and utilizing any one of a number of well-known transfer protocols (e.g., hypertext transfer protocol (HTTP)). Similarly, the computer executable instructions 602 may be transmitted or received using a transmission medium via the coupling 726 (e.g., a peer-to-peer coupling) to the devices 722. The terms "transmission medium" and "signal medium" mean the same thing and may be used interchangeably in this disclosure. The terms "transmission medium" and "signal medium" shall be taken to include any intangible medium that is capable of storing, encoding, or carrying the computer executable instructions 602 for execution by the machine 700, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The following examples pertain to further embodiments, from which numerous permutations and configurations will be apparent.

Example 1

A computer-implemented method, comprising: receiving, at a processing unit, a first information element comprising indications of information about data for an analytic workflow; receiving, at the processing unit, a second information element comprising indication of information about the analytic workflow; splitting the analytic workflow into a plurality of sub-workflows based on the information about the data and the information about the analytic workflow; generating a data format library comprising indications of at least one data format for the sub-workflows; and generating an algorithm compilation library comprising indications of the sub-workflows.

Example 2

The computer-implemented method of example 1, wherein the information about the analytic workflow comprises indications of mathematical primitives used in the analytic workflow.

Example 3

The computer-implemented method of example 1, wherein the data format library comprises indications of a data format and a data encryption scheme.

Example 4

The computer-implemented method of example 1, wherein the algorithm compilation library comprises indications of a first sub-workflow comprising and a second sub-workflow different from the first sub-workflow.

Example 5

The computer-implemented method of example 4, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

Example 6

The computer-implemented method of example 1, comprising: receiving, at the processing unit, a third information element comprising indication of information about communication requirements of the analytic workflow; and splitting the analytic workflow into the plurality of sub-workflows further based on the information about the communication requirements of the analytic workflow.

Example 7

The computer-implemented method of example 1, comprising: sending the data format library to a data owner device; and receiving, from the data owner device, formatted and encrypted data based on the data format library.

Example 8

The computer-implemented method of example 7, comprising: sending the algorithm compilation library to an analytic workflow owner device; and receiving, from the analytic workflow owner device, a compiled machine learning model based on the algorithm compilation library, wherein the compiled machine learning model comprises the plurality of sub-workflows.

Example 9

The computer-implemented method of example 8, comprising executing the compiled machine learning model with the formatted and encrypted data.

Example 10

A computing apparatus, the computing apparatus comprising: a processor; and memory storing instructions, which when executed by the processor, cause the apparatus to: receive a first information element comprising indications of information about data for an analytic workflow; receive a second information element comprising indication of information about the analytic workflow; split the analytic workflow into a plurality of sub-workflows based on the information about the data and the information about the analytic workflow; generate a data format library comprising indications of at least one data format for the sub-workflows; and generate an algorithm compilation library comprising indications of the sub-workflows.

Example 11

The computing apparatus of example 10, wherein the information about the analytic workflow comprises indications of mathematical primitives used in the analytic workflow.

Example 12

The computing apparatus of example 10, wherein the data format library comprises indications of a data format and a data encryption scheme.

Example 13

The computing apparatus of example 10, wherein the algorithm compilation library comprises indications of a first sub-workflow comprising and a second sub-workflow different from the first sub-workflow.

Example 14

The computing apparatus of example 13, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

Example 15

The computing apparatus of example 10, the instructions when executed by the processor, cause the apparatus to: receive, a third information element comprising indication of information about communication requirements of the analytic workflow; and split the analytic workflow into the plurality of sub-workflows further based on the information about the communication requirements of the analytic workflow.

Example 16

The computing apparatus of example 10, the instructions when executed by the processor, cause the apparatus to: send the data format library to a data owner device; and receive, from the data owner device, formatted and encrypted data based on the data format library.

Example 17

The computing apparatus of example 16, the instructions when executed by the processor, cause the apparatus to: send the algorithm compilation library to an analytic workflow owner device; and receive, from the analytic workflow owner device, a compiled machine learning model based on the algorithm compilation library, wherein the compiled machine learning model comprises the plurality of sub-workflows.

Example 18

The computing apparatus of example 17, the instructions when executed by the processor, cause the apparatus to execute the compiled machine learning model with the formatted and encrypted data.

Example 19

A non-transitory computer-readable storage medium, the computer-readable storage medium including instructions that when executed by a computer, cause the computer to: receive, at a processing unit, a first information element comprising indications of information about data for an analytic workflow; receive, at the processing unit, a second information element comprising indication of information about the analytic workflow; split the analytic workflow into a plurality of sub-workflows based on the information about the data and the information about the analytic workflow; generate a data format library comprising indications of at least one data format for the sub-workflows; and generate an algorithm compilation library comprising indications of the sub-workflows.

Example 20

The computer-readable storage medium of example 19, wherein the information about the analytic workflow comprises indications of mathematical primitives used in the analytic workflow.

Example 21

The computer-readable storage medium of example 19, wherein the data format library comprises indications of a data format and a data encryption scheme.

Example 22

The computer-readable storage medium of example 19, wherein the algorithm compilation library comprises indications of a first sub-workflow comprising and a second sub-workflow different from the first sub-workflow.

Example 23

The computer-readable storage medium of example 22, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

Example 24

The computer-readable storage medium of example 19, the instructions when executed by the computer, cause the computer to: receive, at the processing unit, a third information element comprising indication of information about communication requirements of the analytic workflow; and split the analytic workflow into the plurality of sub-workflows further based on the information about the communication requirements of the analytic workflow.

Example 25

The computer-readable storage medium of example 19, the instructions when executed by the computer, cause the computer to: send the data format library to a data owner device; and receive, from the data owner device, formatted and encrypted data based on the data format library.

Example 26

The computer-readable storage medium of example 25, the instructions when executed by the computer, cause the computer to: send the algorithm compilation library to an analytic workflow owner device; and receive, from the analytic workflow owner device, a compiled machine learning model based on the algorithm compilation library, wherein the compiled machine learning model comprises the plurality of sub-workflows.

Example 27

The computer-readable storage medium of example 26, the instructions when executed by the computer, cause the computer to execute the compiled machine learning model with the formatted and encrypted data.

Example 28

An apparatus, comprising: receiving means to receive a first information element comprising indications of information about data for an analytic workflow and to receive a second information element comprising indication of information about the analytic workflow; splitting means to split the analytic workflow into a plurality of sub-workflows based on the information about the data and the information about the analytic workflow; generating means to generate a data format library comprising indications of at least one data format for the sub-workflows to generate an algorithm compilation library comprising indications of the sub-workflows.

Example 29

The apparatus of example 28, wherein the information about the analytic workflow comprises indications of mathematical primitives used in the analytic workflow.

Example 30

The apparatus of example 28, wherein the data format library comprises indications of a data format and a data encryption scheme.

Example 31

The apparatus of example 28, wherein the algorithm compilation library comprises indications of a first sub-workflow comprising and a second sub-workflow different from the first sub-workflow.

Example 32

The apparatus of example 31, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

Example 33

The apparatus of example 28, comprising: the receiving means to receive a third information element comprising indication of information about communication requirements of the analytic workflow; and the splitting means to split the analytic workflow into the plurality of sub-workflows further based on the information about the communication requirements of the analytic workflow.

Example 34

The apparatus of example 28, comprising: sending means to send the data format library to a data owner device; and the receiving means to receive formatted and encrypted data based on the data format library.

Example 35

The apparatus of example 34, comprising: the sending means to send the algorithm compilation library to an analytic workflow owner device; and the receiving means to receive a compiled machine learning model based on the algorithm compilation library, wherein the compiled machine learning model comprises the plurality of sub-workflows.

Example 36

The apparatus of example 35, comprising executing means to execute the compiled machine learning model with the formatted and encrypted data.

What is claimed is:

1. A computer-implemented method, comprising:
receiving, at a processing unit, a first information element comprising indications of information about data for an analytic workflow, the data to comprise homomorphically encrypted data which allows application of mathematical operands directly to the homomorphically encrypted data without decryption of the homomorphically encrypted data;
receiving, at the processing unit, a second information element comprising indication of information about the analytic workflow;
splitting the analytic workflow into a plurality of sub-workflows based on the information about the data and the information about the analytic workflow, wherein one of the plurality of sub-workflows corresponds to a homomorphic encrypted data operation;
generating a data format library comprising indications of at least one data format for the sub-workflows; and
generating an algorithm compilation library comprising indications of the sub-workflows.

2. The computer-implemented method of claim 1, wherein the information about the analytic workflow comprises indications of mathematical primitives used in the analytic workflow.

3. The computer-implemented method of claim 1, wherein the data format library comprises indications of a data format and a data encryption scheme.

4. The computer-implemented method of claim 1, wherein the algorithm compilation library comprises indications of a first sub-workflow comprising and a second sub-workflow different from the first sub-workflow.

5. The computer-implemented method of claim 4, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

6. The computer-implemented method of claim 1, comprising:
receiving, at the processing unit, a third information element comprising indication of information about communication requirements of the analytic workflow; and
splitting the analytic workflow into the plurality of sub-workflows further based on the information about the communication requirements of the analytic workflow.

7. The computer-implemented method of claim 1, comprising:
sending the data format library to a data owner device;
receiving, from the data owner device, formatted and encrypted data based on the data format library;
sending the algorithm compilation library to an analytic workflow owner device;
receiving, from the analytic workflow owner device, a compiled machine learning model based on the algorithm compilation library, wherein the compiled machine learning model comprises the plurality of sub-workflows; and
executing the compiled machine learning model with the formatted and encrypted data.

8. A computing apparatus, the computing apparatus comprising:
a processor; and
memory storing instructions, which when executed by the processor, cause the apparatus to:
receive a first information element comprising indications of information about data for an analytic workflow, the data to comprise homomorphically encrypted data which allows application of mathematical operands directly to the homomorphically encrypted data without decryption of the homomorphically encrypted data;
receive a second information element comprising indication of information about the analytic workflow;
split the analytic workflow into a plurality of sub-workflows based on the information about the data and the information about the analytic workflow, wherein one of the plurality of sub-workflows corresponds to a homomorphic encrypted data operation;
generate a data format library comprising indications of at least one data format for the sub-workflows; and
generate an algorithm compilation library comprising indications of the sub-workflows.

9. The computing apparatus of claim 8, wherein the information about the analytic workflow comprises indications of mathematical primitives used in the analytic workflow.

10. The computing apparatus of claim 8, wherein the data format library comprises indications of a data format and a data encryption scheme.

11. The computing apparatus of claim 8, wherein the algorithm compilation library comprises indications of a first sub-workflow comprising and a second sub-workflow different from the first sub-workflow.

12. The computing apparatus of claim 11, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

13. The computing apparatus of claim 8, the instructions when executed by the processor, cause the apparatus to:
receive, a third information element comprising indication of information about communication requirements of the analytic workflow; and
split the analytic workflow into the plurality of sub-workflows further based on the information about the communication requirements of the analytic workflow.

14. The computing apparatus of claim 8, the instructions when executed by the processor, cause the apparatus to:
send the data format library to a data owner device; and
receive, from the data owner device, formatted and encrypted data based on the data format library.

15. The computing apparatus of claim 14, the instructions when executed by the processor, cause the apparatus to:
send the algorithm compilation library to an analytic workflow owner device; and
receive, from the analytic workflow owner device, a compiled machine learning model based on the algorithm compilation library, wherein the compiled machine learning model comprises the plurality of sub-workflows.

16. The computing apparatus of claim 15, the instructions when executed by the processor, cause the apparatus to execute the compiled machine learning model with the formatted and encrypted data.

17. A non-transitory computer-readable storage medium, the computer-readable storage medium including instructions that when executed by a computer, cause the computer to:
receive, at a processing unit, a first information element comprising indications of information about data for an analytic workflow, the data to comprise homomorphically encrypted data which allows application of mathematical operands directly to the homomorphically encrypted data without decryption of the homomorphically encrypted data;
receive, at the processing unit, a second information element comprising indication of information about the analytic workflow;
split the analytic workflow into a plurality of sub-workflows based on the information about the data and the information about the analytic workflow, wherein one of the plurality of sub-workflows corresponds to a homomorphic encrypted data operation;
generate a data format library comprising indications of at least one data format for the sub-workflows; and
generate an algorithm compilation library comprising indications of the sub-workflows.

18. The computer-readable storage medium of claim 17, wherein the information about the analytic workflow comprises indications of mathematical primitives used in the analytic workflow.

19. The computer-readable storage medium of claim 17, wherein the data format library comprises indications of a data format and a data encryption scheme.

20. The computer-readable storage medium of claim 17, wherein the algorithm compilation library comprises indications of a first sub-workflow comprising and a second sub-workflow different from the first sub-workflow.

21. The computer-readable storage medium of claim 20, wherein the first sub-workflow comprises execution of a first mathematical primitive on homomorphic encrypted data and the second sub-workflow comprises execution of a second mathematical primitive on decrypted data, wherein the first mathematical primitive is different from the second mathematical primitive.

22. The computer-readable storage medium of claim 17, the instructions when executed by the computer, cause the computer to:
receive, at the processing unit, a third information element comprising indication of information about communication requirements of the analytic workflow; and
split the analytic workflow into the plurality of sub-workflows further based on the information about the communication requirements of the analytic workflow.

23. The computer-readable storage medium of claim 17, the instructions when executed by the computer, cause the computer to:
send the data format library to a data owner device; and
receive, from the data owner device, formatted and encrypted data based on the data format library.

24. The computer-readable storage medium of claim 23, the instructions when executed by the computer, cause the computer to:
send the algorithm compilation library to an analytic workflow owner device; and
receive, from the analytic workflow owner device, a compiled machine learning model based on the algorithm compilation library, wherein the compiled machine learning model comprises the plurality of sub-workflows.

25. The computer-readable storage medium of claim 24, the instructions when executed by the computer, cause the computer to execute the compiled machine learning model with the formatted and encrypted data.

* * * * *